July 12, 1949.
A. BRIECHLE
2,475,658
PHOTOGRAPHIC DEVELOPING APPARATUS WITH
EASILY ACCESSIBLE TANKS AND CONVEYERS
Filed Aug. 18, 1944
7 Sheets-Sheet 4
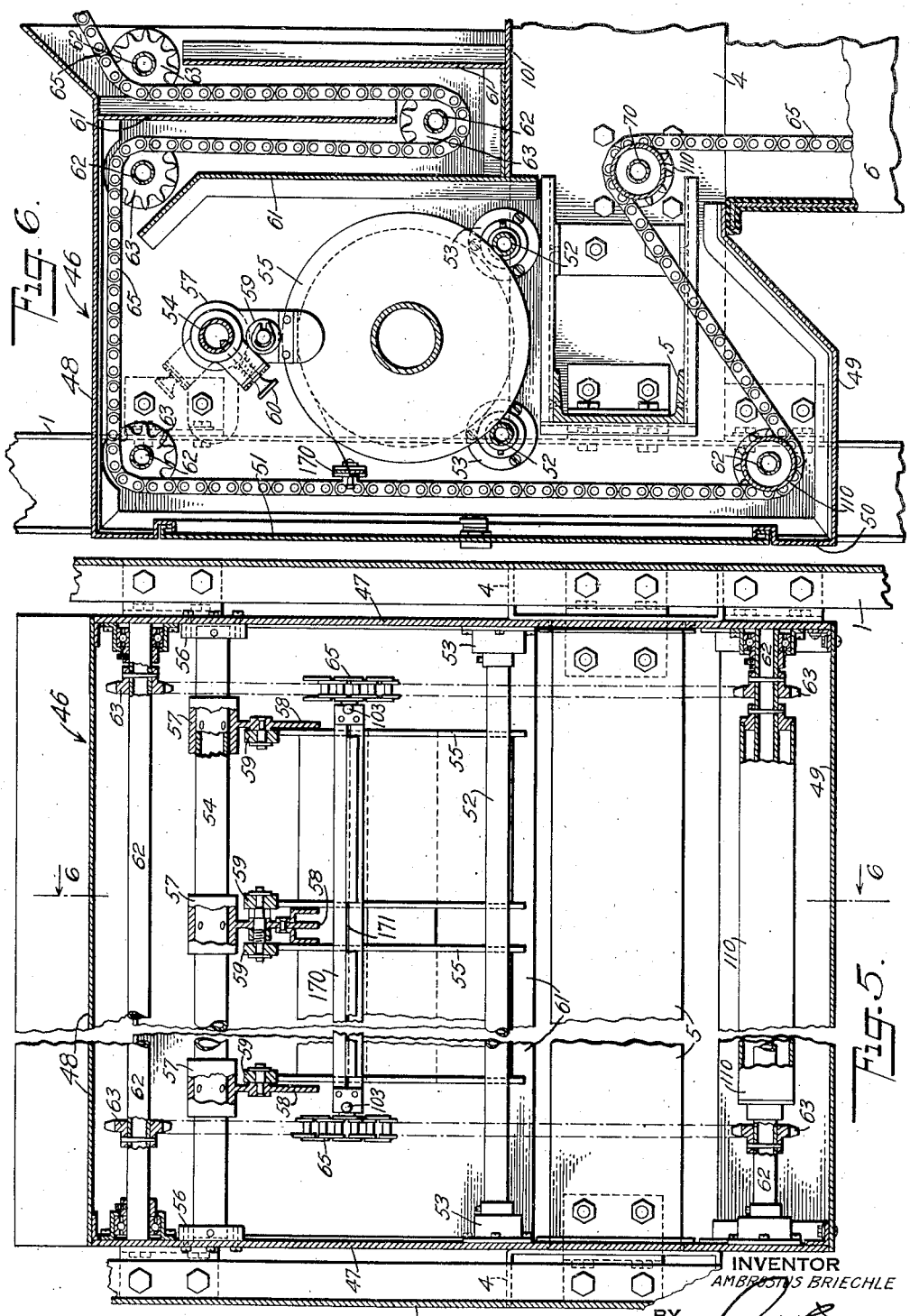
INVENTOR
AMBROSIUS BRIECHLE
BY
ATTORNEY

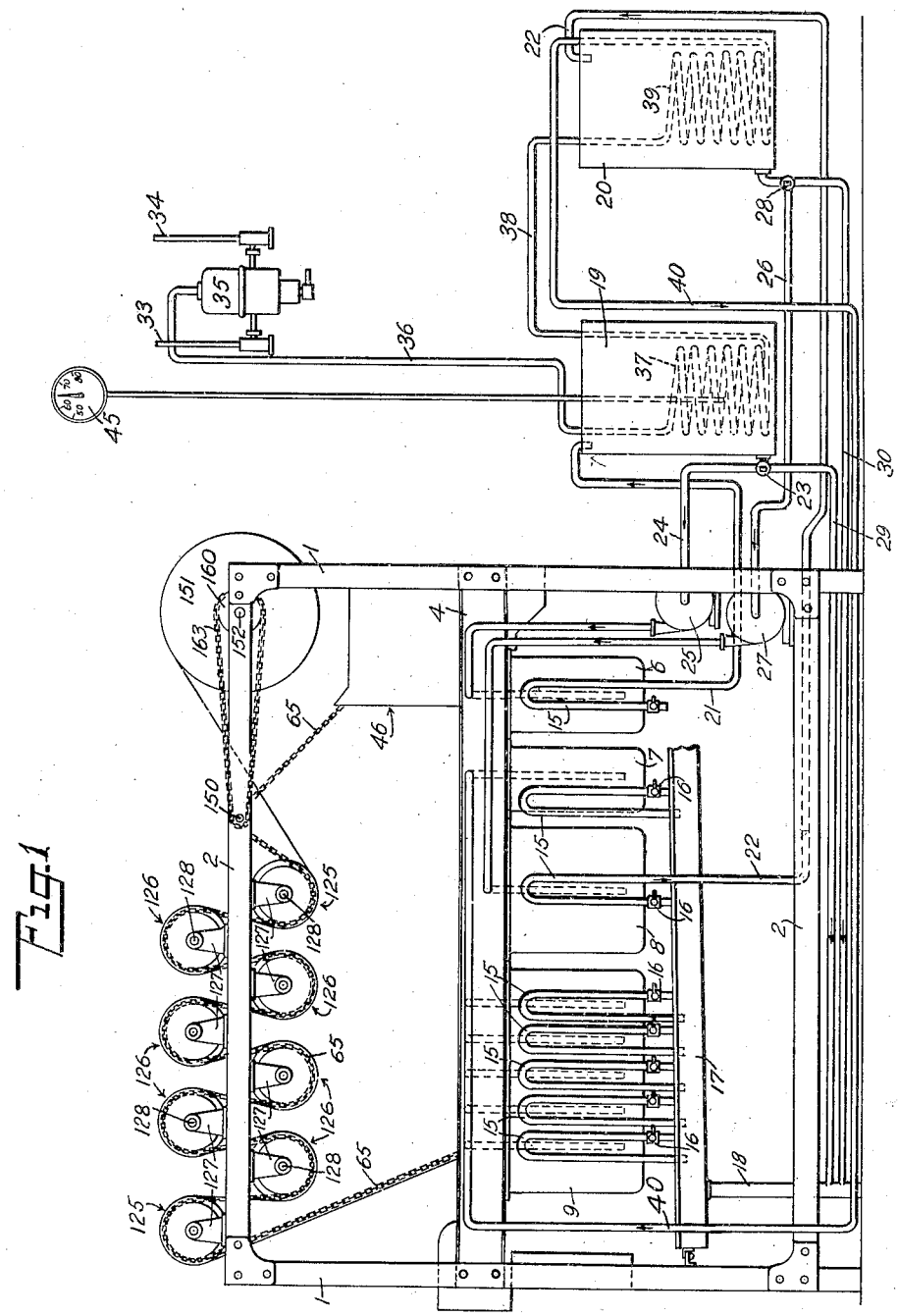

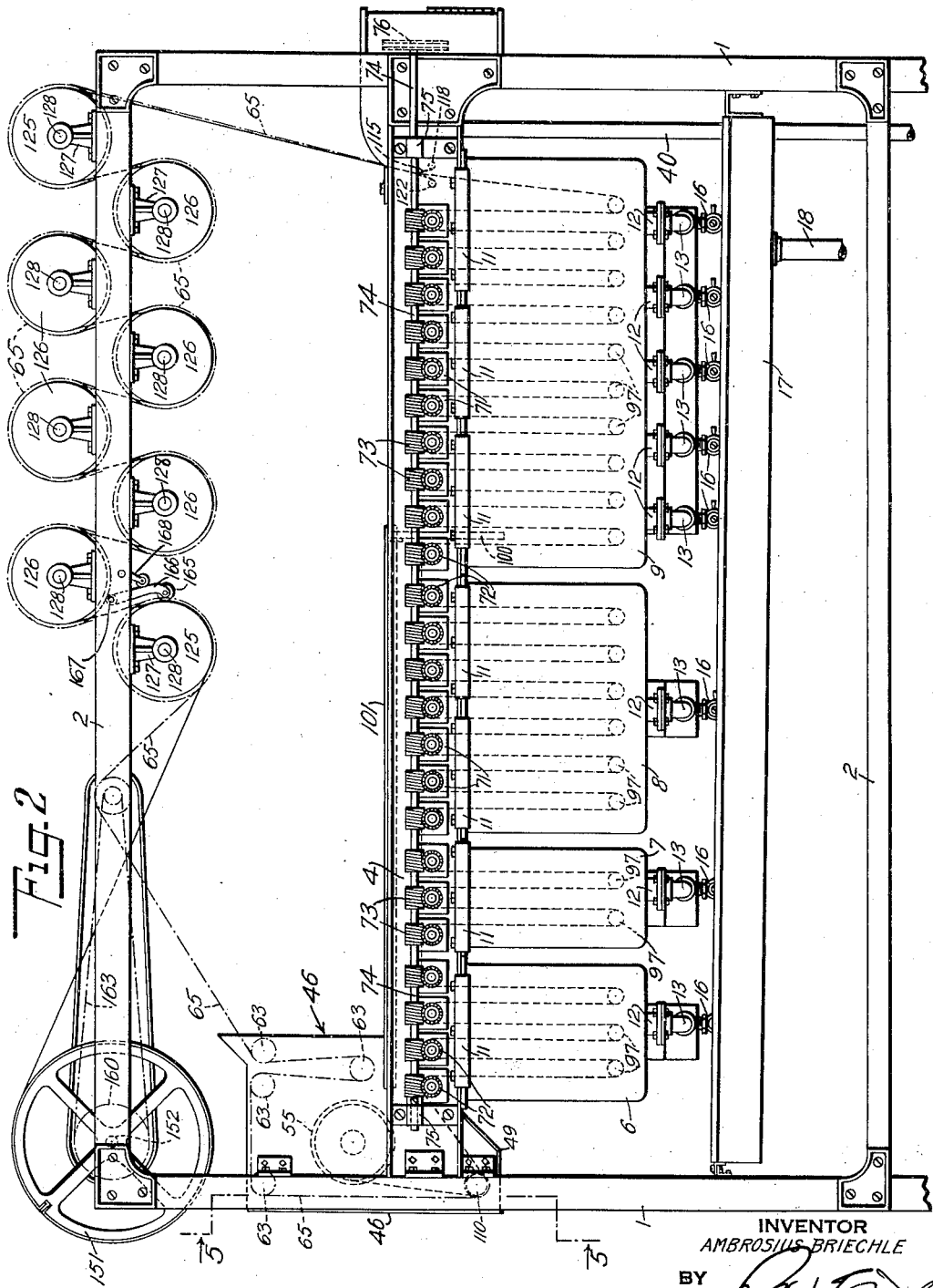

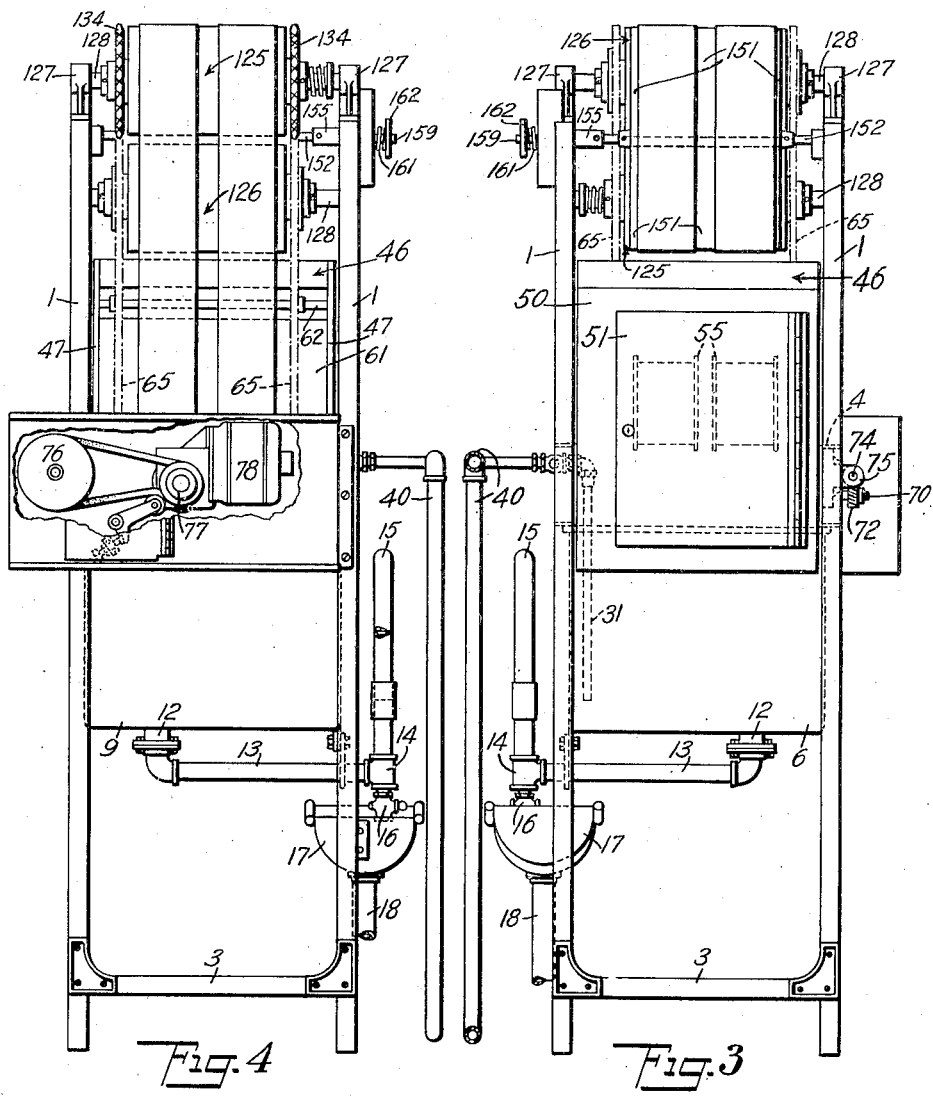

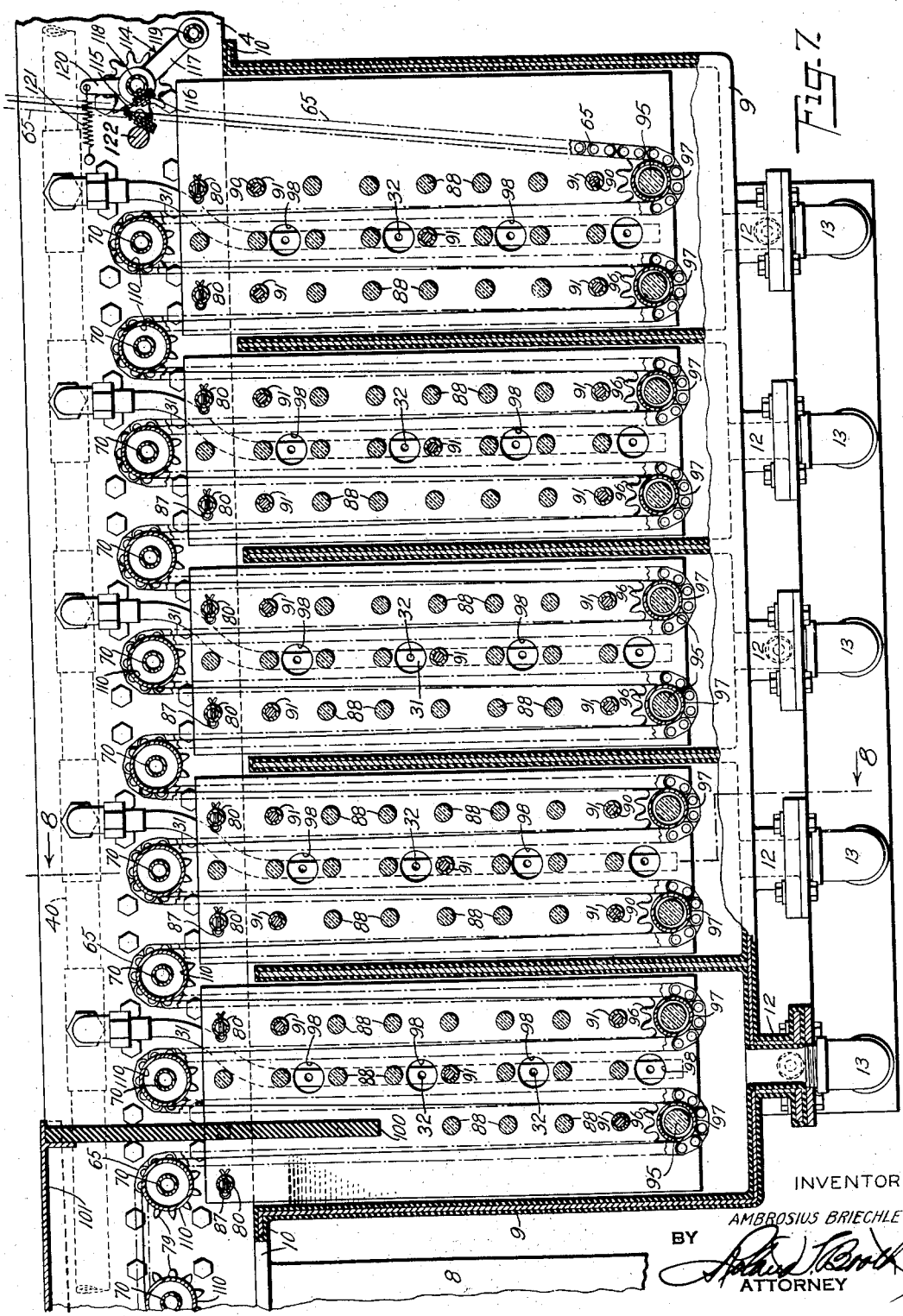

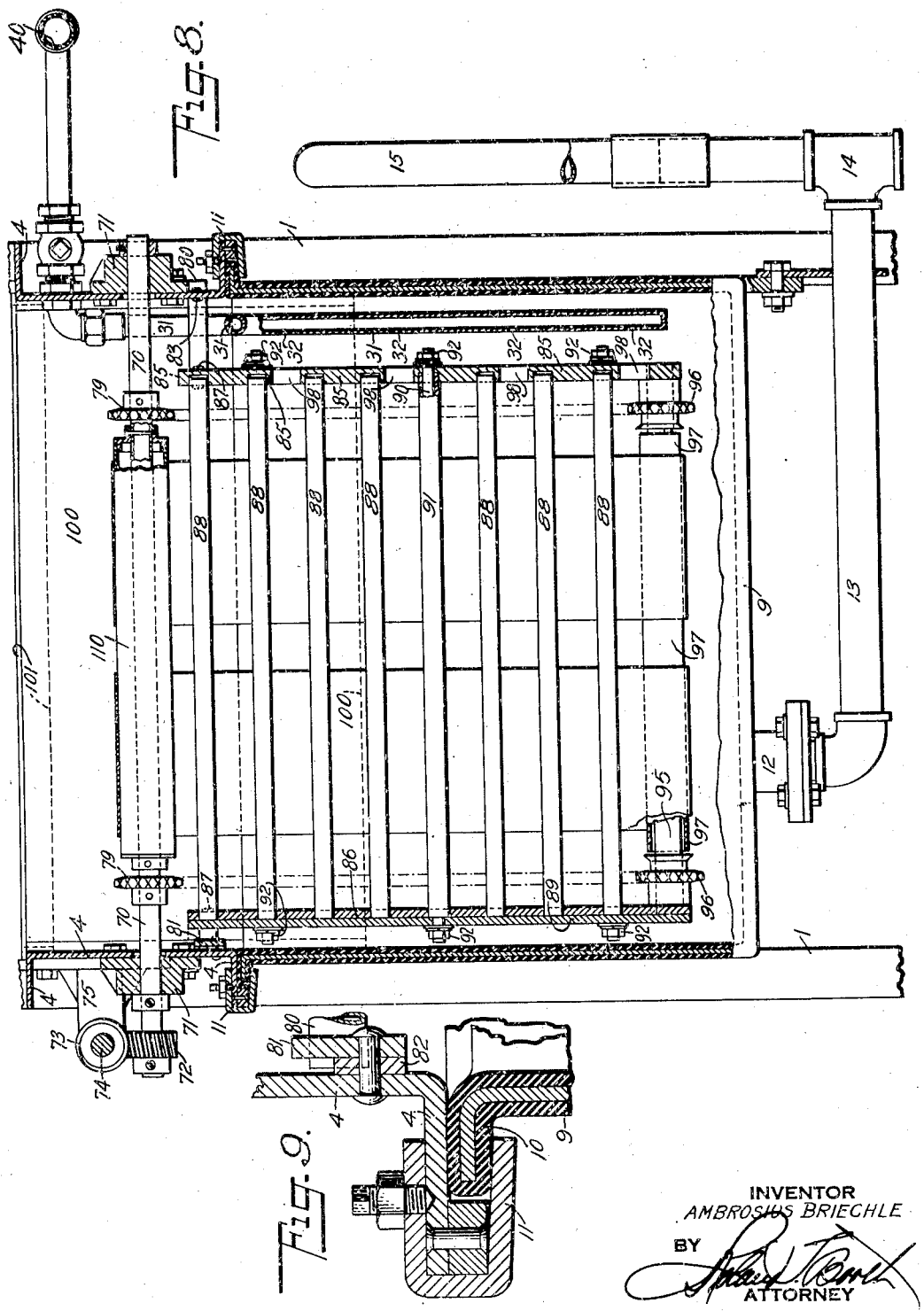

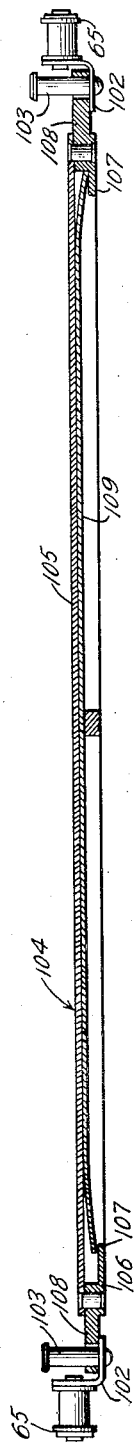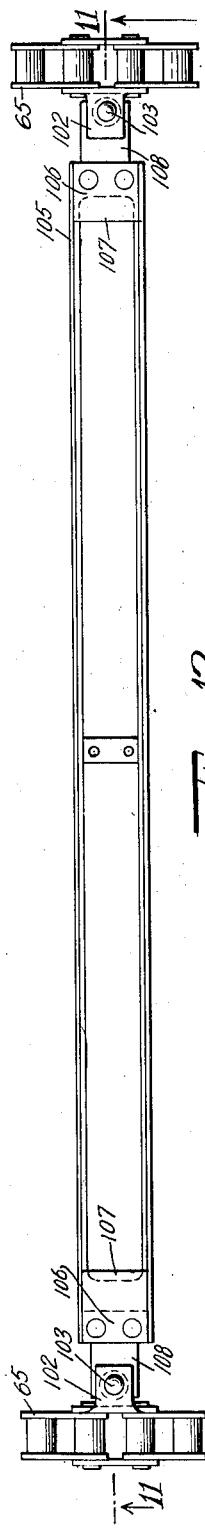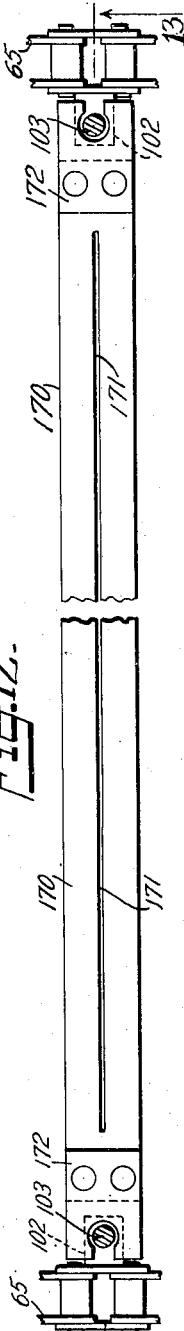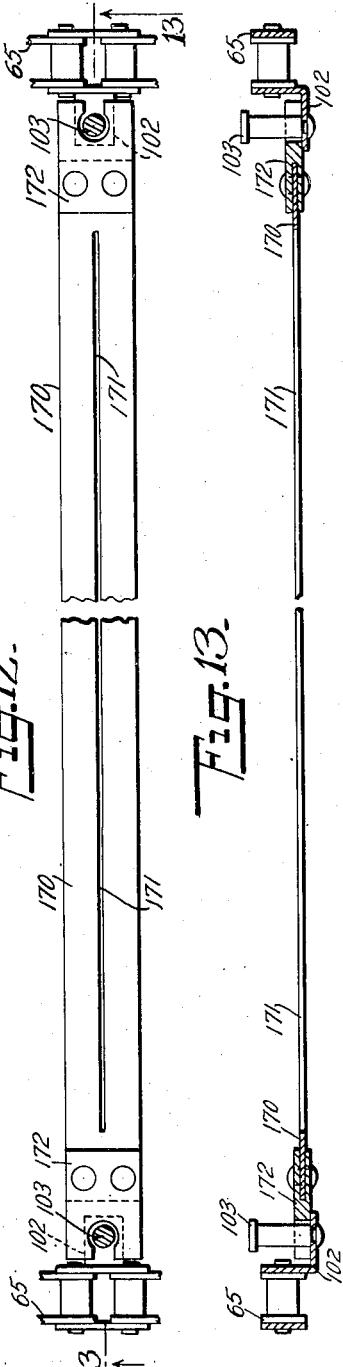

Patented July 12, 1949

2,475,658

UNITED STATES PATENT OFFICE 2,475,658

PHOTOGRAPHIC DEVELOPING APPARATUS WITH EASILY ACCESSIBLE TANKS AND CONVEYERS

Ambrosius Briechle, Brooklyn, N. Y., assignor to Remington Rand Inc., Buffalo, N. Y., a corporation of Delaware Application August 18, 1944, Serial No. 550,043

10 Claims. (Cl. 95—90.5)

This invention relates to photographic developing apparatus particularly designed to develop, fix, wash and dry photo-sensitized sheet material.

The invention provides a photographic developing apparatus that obtains greater efficiency from the photographic chemicals used in developing and fixing sensitized sheet material, materially increases the productive capacity of developing apparatus in providing completely and uniformly developed and dried photographic prints to obtain a uniform quality in the prints at lower cost.

The invention comprehends the provision of photographic developing apparatus having a plurality of baths for the treatment of photo-sensitized sheet material in which a plurality of tanks for containing the baths are mounted on a supporting frame in cooperation with a suitable feeding device for feeding photo-sensitized sheets through the baths in the tanks and provide for the removal of one or more tanks for cleaning, washing, repair and replacement without requiring the removal of any part of the mechanism for feeding sheets or the supporting frame structure prior to the removal of a tank. Any one or more of the tanks may be independently removed by being dropped down below the sheet feeding mechanism and thereafter removed from the machine in a convenient manner. Each tank is individually detachable from the machine independent of the others without rendering the machine inoperative with respect to the other tanks.

The invention provides for obtaining greater efficiency in the use of the developing and fixing chemicals through provision of supply tanks connected with the respective developing and fixing treatment tanks and a mechanism for continuously circulating the chemicals through the respective tanks, with the provision of nozzles in the treatment tanks for obtaining circulation of the chemicals in the tanks to keep them thoroughly mixed and active on the photo-sensitive coatings of sheet material fed through the tanks. By providing supply tanks of sufficient size the invention contemplates reduction in operation cost through securing continued operation of the machine in developing prints by eliminating frequent changes and utilizing a greater percentage of the strength of the chemical solutions for both developing and fixing.

The invention provides for mounting the developing tanks for easy removal by having the tanks detachably connected to the frame of the developing apparatus so that they may be lowered from the frame portions on which they are mounted into positions out of engagement with the feed mechanism of the apparatus. The tanks are provided with drain and fluid level control means secured to the tank structure in a manner that provides for the convenient removal of the tanks from the apparatus with the drain and fluid level control structure.

The invention comprehends the provision of a feed casing for receiving the material to be developed in light-tight relation so arranged that the sheet material may be fed successively from the casing into the developing and fixing baths carried in separate tanks mounted on the frame. The feed casing and tanks are formed to provide an entrance and exit to the feed casing and the developing and fixing baths from which light is excluded. The entrance and exit are both formed to provide a light-trap and a passage for endless conveyor members used to convey sheet material from the feed casing through the baths with subsequent delivery of the sheet material from the apparatus outside of the light-tight portion thereof and the return of the endless members into the feed casing through the entrance.

The invention provides for obtaining agitation of the liquid in the several treatment tanks by having discharge nozzles extending downwardly in one side of the tanks provided with a plurality of discharge openings for directing liquid from said nozzles in substantially horizontal transverse relation throughout the treatment tanks for continuously mixing the liquid in the tanks and circulating it about the sheet material being fed therethrough for treatment.

The invention provides for the mounting of the treatment tanks and supporting and guide mechanism for the feed means on a frame structure in such a manner that the supporting and guide units for the feed means will project into the tanks for feeding and guiding the feed means and material to be treated through the liquid in the tanks, so the tanks may be removed from the frame structure without disturbing the mounting of the guide units and feed means on the frame, and also provide for the removal of the guide unit from the frame without interfering with the mounting of the tanks thereon.

The invention provides for the use of endless lineally movable feed members for conveying sheet material to be treated through the treatment tanks from a feed casing and subsequent feeding by the same endless members over a drying mechanism for producing completely developed and dried photographic prints with the endless members continuously movable through the feed casing, the tanks containing the treatment baths and the drying means, and the provision of suitable means for excluding light from the feed casing and part of the treatment baths containing the developing and fixing chemicals.

In the drawings:

Fig. 1 is a substantially diagrammatic view showing the frame structure for the apparatus in side elevation carrying the feed casing, treating tanks and drying mechanism and the supply tanks, controlling means, pipe connections and the like for circulating liquid in the tanks.

Fig. 2 is an enlarged side elevation of the frame structure carrying the feed casing, treating tanks, drying mechanism and the like in greater detail, looking at the opposite side of the frame from that shown in Fig. 1.

Fig. 3 is a front elevation of the apparatus.

Fig. 4 is a view similar to Fig. 3, showing a rear elevation of the apparatus with portions of the casing housing the electric motor drive broken away to illustrate details of construction of the drive.

Fig. 5 is an enlarged detail cross-section showing the structure of the feed casing with portions broken away and shown in section to illustrate the details of construction, taken on line 5—5 of Fig. 2.

Fig. 6 is a cross-section taken on line 6—6 of Fig. 5.

Fig. 7 is a vertical longitudinal cross-section through a wash tank showing the details of construction on an enlarged scale with fragmentary portions of the associated frame structure and the feeding and guiding mechanism for sheet material.

Fig. 8 is a vertical transverse cross-section taken on line 8—8 of Fig. 7.

Fig. 9 is an enlarged detail transverse fragmentary cross-section showing a portion of a horizontal bar of the frame and the means for mounting and holding a treatment tank in suspended relation.

Fig. 10 shows an enlarged detail elevation of a sheet feed bar and its mounting on the endless feed members.

Fig. 11 is a detail cross-section taken on line 11—11 of Fig. 10.

Fig. 12 is a view similar to Fig. 10 with portions broken away and shown in section illustrating a modified form of feed bar.

Fig. 13 is a cross-section taken on line 13—13 of Fig. 12.

A supporting frame has corner posts 1 extending in upright relation and connected at the upper and lower ends by top and bottom side bars 2 and across the end by bottom end bars 3. A pair of spaced parallel horizontal supporting bars 4 are secured at opposite ends to corner posts 1 at an intermediate position between top and bottom side bars 2, as clearly shown in Fig. 2. Supporting bars 4 are of channel shape in cross-section and are mounted in the supporting frame with the flanges extending outwardly at opposite sides of the frame in horizontal relation, as clearly shown in Figs. 2 and 8 while the central portion of the bars extends in vertical relation. A channel bar 5, see Figs. 5 and 6, connects the front ends of bars 4 for cooperating to provide a rigid frame structure.

A plurality of treatment tanks are suspended from bars 4. These tanks include a developing tank 6, washing tank 7, fixing tank 8 and washing tank 9. Each of these treatment tanks is constructed in a similar manner, has a uniform transverse dimension, a uniform vertical dimension with the bottom of each tank lying in the same horizontal plane as shown in Fig. 2, and has a different length longitudinally of the frame. Each tank is open at the upper end. When the tanks are suspended from bars 4 the side walls of each tank are in aligned relation with the inner faces of bars 4 as shown in Fig. 8, and marginal flanges 10 extending laterally from the upper edges of each tank are engaged at the sides of the apparatus in superimposed relation against the under faces of the lower flanges of supporting bars 4 as shown in Figs. 8 and 9. U-shaped clamps 11 embrace the lower flanges of horizontal supporting bars 4 and flanges 10 of the several tank for rigidly securing the tanks in suspended position from the lower faces of bars 4 in the manner shown in Figs. 2, 8 and 9. A plurality of U-shaped clamps 11 are used for individually securing each of the tanks 6 to 9 inclusive in suspended relation from bars 4.

Each tank has a drain pipe coupling 12 formed on the bottom to which drain pipe 13 is attached and extended to one side of each tank below the bottom where it carries a T-shaped coupling 14. An inverted U-shaped liquid level control and overflow pipe 15 has one leg connected to T-shaped coupling 14 with the top portion connecting the two legs thereof arranged at a position beside one side wall of the tank where it will have a position for determining and limiting the level of liquid in the tank controlled thereby and provide for the overflow of liquid forced into a tank in excess of the amount provided to maintain the level therein. Tanks 6, 7 and 8 each have a single U-shaped overflow pipe 15 connected therewith while washing tank 9 having a much greater length than the other tanks is provided with five compartments, as shown in Fig. 7, and provided with five drain connections and overflow pipes so arranged that one is provided for draining each section. The lower end of each T-shaped coupling 14 is provided with a valve controlled drain pipe outlet 16 operable when the valve is opened to drain the contents of the tank controlled thereby. The other leg of the inverted U-shaped overflow pipe 15 for each of the washing tanks 7 and 9 respectively has the lower end open for discharging overflow into drain trough 17. Drain pipe outlet 16 also drains into drain trough 17, as clearly shown in Figs. 1 to 4 inclusive.

Drain trough 17 is provided with a waste pipe connection 18 used for connecting the drain trough with a suitable sewer or other waste disposal system. The other leg of the overflow pipe 15 connected with tanks 6 and 8 is used to return the fluid from each of the tanks to a supply tank through a flexible return pipe in a manner that will be hereinafter described. Drain trough 17 is detachably mounted between uprights 1 at the left-hand side of the machine as shown in Fig. 1 through the use of suitable brackets.

Referring particularly to Fig. 1, two supply tanks are shown, one for containing a supply of developer and the other a supply of fixer. The developing solution is placed in supply tank 19 while the fixing solution is placed in supply tank 20. Return pipe 21 connects overflow 15 of developing tank 6 with developer supply tank 19 so that the discharge end of pipe 21 enters the upper end of tank 19. A return pipe 22 connects with overflow pipe 15 on fixing tank 8 and returns the overflow from the fixing tank 8 to fixer supply tank 20. Return pipes 21 and 22 may have flexible sections to provide for convenient removal of tanks 6 and 8 without disconnecting them. A valve controlled outlet 23 on the bottom of developer supply tank 19 has a supply pipe 24 extending from supply tank 19 to a supporting bar 4 over developing tank 6 for circulating developing fluid between supply tank 19 and tank 6 through the supply pipe and return pipe 21. A suitable type of motor driven circulating pump 25 is connected in the supply pipe between tanks 19 and 6 for circulating the fluid between the supply tank and the developing tank.

The fixer is likewise circulated between fixer supply tank 20 and fixing tank 8 by supply pipe 26 having a motor driven circulating pump 27 connected with the supply pipe between supply tank 20 and fixing tank 8 to provide a positive circulation of fixer from the supply tank to the fixing tank with the overflow returning through pipe 22. A valve controlled outlet 28 controls the entrance of fluid to the supply pipe 26 from the bottom of supply tank 20. Valves 23 and 28 are two-way valves arranged for operation to open the connection with the bottom of tanks 19 and 20 with drain pipes 29 and 30, respectively connected to waste pipe 18 so that the supply tanks for both developer and fixer may be drained and cleaned in preparation for filling the supply tanks with new supplies of developer and fixer.

Each supply pipe 24 and 26 has the end at the respective tanks 6 and 8 connected with nozzles. One of the nozzles is shown in Fig. 8 at 31. Each of the nozzles 31 is mounted in a horizontal frame supporting bar 4 and is arranged in substantially vertical depending relation in the treatment tank terminating near the bottom as shown in Fig. 8. The nozzle is at one end of the tank, and has the portion facing inwardly provided with a plurality of openings 32 through which liquid is discharged from the nozzle at a plurality of points from the bottom to the top portion of the tank in a lateral direction toward the opposite side of the tank in substantially horizontal relation. When the treatment tanks are filled to the desired level controlled by overflow pipes 15, the discharge of fluid under pressure from supply pipes 24 and 26 into the respective tanks 6 and 8 continuously supplies fluid from the supply tanks to the treatment tanks and obtains positive circulation of the fluid in each of the treatment tanks 6 and 8, respectively. The liquid in the treatment tanks 6 and 8 also circulates through drain pipe 19 into U-shaped overflow pipes 15, the liquid overflowing into the pipes 21 and 22 respectively, for return to supply tanks 19 and 20, respectively. This constant circulation of the developing and fixing fluid to treatment tanks 6 and 8 respectively maintains a constant mixing of the chemicals in solution to obtain uniform chemical strength throughout the entire quantity of fluid in the supply and treatment tanks and also obtains active circulation of the fluid in the treatment tanks about paper strip material being fed through the tanks for treatment. By this circulation of the developer and fixer, the effective chemical strength of the fluid can be actively applied to treat the surface of the paper being fed through the treatment tanks rapidly and effectively according to the strength of the chemicals in solution until the strength of the developing chemicals has been reduced to a point where it is no longer sufficiently effective to provide for the desired feed of operation of the machine. At this point the chemicals are drained from the respective tanks, the tanks may thereupon be cleaned and filled with new developing and fixing chemicals.

It is desirable to maintain the developing chemicals at a substantially uniform temperature in order to secure efficient operation in the treatment of sensitized paper and film strips. For this purpose a source of hot and cold water supply is provided as indicated at 33 and 34, respectively. Both the hot and cold water supplies 33 and 34 are connected to an automatic mixing and temperature control valve mechanism indicated at 35 of any suitable form well-known in the art. The outlet for the mixed water at the desired temperature is connected to a supply pipe 36 for delivering the water at the controlled temperature through the pipe coil 37 in supply tank 19 containing the developing solution for circulation through this coil and then through a pipe 38 into pipe coil 39 for circulation through the fixing solution. The temperature controlled water is then discharged from pipe coil 39 in fixer supply tank 20 through pipe 40 connected with discharge nozzles in wash tanks 7 and 9 respectively, of duplicate construction with nozzles 31. All of the discharge nozzles in the several treatment tanks are therefore numbered 31. The circulation of the temperature controlled water in the washing tanks 7 and 9 through the discharge of fluid from discharge nozzles 31 maintains an agitation of the water in the washing tanks substantially similar to that obtained in the developing and fixing tanks 6 and 8. This effectively and uniformly washes the chemically treated coating on the sensitized strip material being fed through the treatment tanks. The temperature controlled water overflows from washing tanks 7 and 9 through overflow pipes 15 for discharge into trough 17 and waste pipe 18. A continuous fresh supply of temperate water for maintaining a substantially constant temperature in all of the treatment baths in tanks 6 to 9 inclusive is obtained by this mechanism through the control of the automatic mixing and temperature control mechanism 35.

A suitable temperature indicating device is shown at 45 in Fig. 1 for registering the temperature in developer supply tank 19. Similar temperature indicators can be used in the other tanks if desired but it is found that for most developing work the single temperature indicator in the developer is sufficient for the operator of the machine to control the temperature throughout the system so that it is maintained at a substantially uniform temperature of the character required to obtain efficient processing of photosensitized strip material.

A feed casing 46 is mounted at the front end of the supporting frame. Feed casing 46 has side walls 47, Figs. 5 and 6, top wall 48, bottom wall 49 and front wall 50 formed with an opening closed by door 51 hinged in a suitable manner to the front wall, as shown in Figs. 3 and 6, to provide a light-tight closure. Side walls 47 are secured to horizontal supporting bars 4 with the major portion of feed casing 46 arranged above the top flanges of bars 4 so that the bottom wall 49 is spaced slightly below the lower flanges of bars 4, as clearly shown in Figs. 5 and 6. This provides an open passage from the interior of feed casing 46 at the lower portion below cross bar 5 extending rearwardly into the space between supporting bars 4 for the passage of sheet material into developing tank 6. Casing 46 is mounted in light-tight relation on the front end of the frame and developing tank 6 has the forward edge seated in light-tight relation against the rear edge of bottom wall 49 as shown in Fig. 6. Feed casing 46 provides a compartment for receiving spools of sensitized strip material to be developed so that the material can be fed from the spools through the several treatment tanks.

A spool cradle is therefore provided in feed casing 46 as shown in Figs. 5 and 6. This spool cradle has a pair of spaced parallel shaft members 52 extending transversely between side walls 47 and journalled at opposite ends in bearings 53 carried by side walls 47. Spools 55 are adapted to be mounted with the peripheries of the spool end flanges seated on shafts 52, in the manner shown in Figs. 5 and 6.

A tubular shaft 54 is rigidly mounted at opposite ends in sockets 56 carried by side walls 47 and intermediate the ends, shaft 54 adjustably mounts a plurality of spool positioning members 57 thereon. Spool positioning members 57 have spool guide and spacing fingers 58 extending radially therefrom and arranged to engage the ends of spools 55 mounted in the cradle for holding them against endwise movement in the cradle. Fingers 58 carry rollers 59 adapted to be resiliently engaged with the peripheries of spool ends 55 in one position of positioning members 57 for retaining spools 55 rotatably engaged in the cradle during the feeding of strip material from the spools. More than one spool can be mounted in end-to-end relation in feed casing 46, as shown in Fig. 5. A spring pressed manually operable retaining pin 60 is mounted in each spool positioning member 57 and is adapted to engage in a socket in shaft 54 for retaining each positioning member 57 in either of two radial positions on shaft 54 forming operative and inoperative positions. By the operation of spool positioning members 57 spools may be inserted into and removed from the cradle in feed casing 46 through the opening controlled by door 51.

The rear portion of feed casing 46 is formed to provide an entrance for an endless conveyor through a light-trap, as shown in Fig. 6. This entrance and light-trap comprises a plurality of spaced parallel rear wall sections 61, the central section extending downwardly from top wall 48 between two outer rear wall sections extending upwardly from the bottom. The upper ends of the outer spaced wall sections terminate in spaced relation to top wall 48 and the central wall section terminates in spaced relation above the bottom rear portion of the casing and the upper edges of supporting bars 4 so that a circuitous passage is provided through the rear of the casing to the interior thereof.

A plurality of sprocket shafts 62 extend transversely of feed casing 46 and are rotatably mounted in bearings secured to side walls 47. A pair of chain sprockets 63 are mounted on each shaft 62 in uniform spaced relation adjacent side walls 47. One of the shafts 62 is mounted above the upper edge of outer rear wall section 61 as shown in Fig. 6 in the entrance to the light-trap. Another shaft 62 is mounted below the lower edge of central rear wall section 61. A third shaft 62 is mounted at the upper inner portion of the entrance passage above the upper edge of the inner rear wall section 61 where the light-trap and entrance communicates with the interior of the feed casing. Two shafts 62 are mounted in transversely extending relation across the upper and lower front inner portions of the feed casing, as shown in Fig. 6. These shafts and their sprockets provide for supporting and guiding a pair of endless chain members 65 through the light-trap from the outside to the interior of feed casing 46, to the forward side portions of the casing and then downwardly in front of the spool cradle to the lower front portion of the casing. From the lower front portion of the casing the endless members 65 extend upwardly and rearwardly between supporting bars 4.

A plurality of power driven shafts 70 are rotatably mounted in bearings 71 secured to the outside upright central portions of the channel bars forming supporting members 4. Shafts 70 extend in transverse relation between bars 4. Shafts 70 have the free ends at one side of the frame extending beyond bearings 71 and each rigidly mounting a worm gear 72 in mesh with a worm gear 73 mounted on longitudinally extending rotatable drive shaft 74. Bearings 75 rotatably mount drive shaft 74 on one of the horizontal supporting bars 4. One end of main drive shaft 74 extends to the rear of the frame, as shown in Figs. 2 and 4, where it carries a pulley 76. A belt drive, shown in Fig. 4 and indicated as 77, is provided to transmit power from electric motor 78 for driving main drive shaft 74 and rotating driven shaft 70 for driving endless chain members 65 to produce lineal movement thereof in the operation of the machine. Each of the driven shafts 70 carries a pair of uniformly spaced sprockets 79 over which endless members 65 are engaged.

Driven shafts 70 are arranged throughout the length of supporting bars 4 to provide a downwardly extending loop in endless members 65 extending into the several treatment tanks 6 to 9 inclusive, as shown in dotted lines in Fig. 2. These loops are arranged between adjacent shafts 70. At adjacent ends of the treatment tanks members 65 extend directly between the sprockets on adjacent shafts 70.

Guide units are provided for guiding the loops of endless members 65 and sheet material to be treated in the tanks. These guide units are illustrated in detail in Figs. 7 and 8. Each unit has a pair of transversely spaced parallel carrying bars 80 extending between horizontal supporting bars 4 with opposite ends detachably supported by bars 4. The left-hand end of each of the carrying bars 80, as shown in Figs. 8 and 9, is slidably engaged in an aperture in holding bar 81 rigidly secured to the inner face of the left-hand channel-shaped supporting bar 4 with spacer strip 82. The opposite ends of carrying bars 80 extend through apertures in the vertical web portion of channel bars 4 as shown at the right-hand side of Fig. 8. These carrying bars 80 are retained in engaged position in transversely extending relation between bars 4 by means of cotter pins 83 extending transversely through the right-hand ends of carrying bars 80 as they are shown in Fig. 8.

A pair of end members 85 and 86 respectively, are suspended in spaced parallel relation from each pair of carrying bars 80 in the manner shown in Figs. 8 and 9 between supporting bars 4 in downwardly extending relation to the bottom portion of the treatment tanks, one pair of end members being suspended from each pair of carrying bars 80. Cotter pins 87 are used to retain the end members against longitudinal sliding movement on carrying bars 80. End member 85 is provided with a plurality of sockets for receiving glass spacer and guide rods 88. These guide rods 88 extend in spaced parallel relation in the center and at the side portions in vertically aligned relation between end members 85 and 86. The right-hand ends of rods 88 as shown in Fig. 8, engage in the sockets in end member 85 and the left-hand ends in apertures in end member 86. A retainer plate 89 is secured to the outer face of end member 86 for closing the outer ends of the apertures therein and retaining rods 88 in interengaged positions with the opposite ends seated in end members 85 and 86. A plurality of retainer rods 90 extend in transverse parallel relation to glass spacer rods 88 and have opposite ends extending through apertures in end members 85 and 86 and retainer plate 89. Spacer sleeves 91 are engaged over each rod 90 and seat in sockets in end member 85 and apertures in end member 86 in the same manner as glass rods 88. Nuts 92 are screw threaded on opposite ends of rods 90 at the outer sides of end member 85 and retainer plate 89 for firmly securing the end members and retainer plate together in spaced parallel assembled relation to form the guide unit.

Shafts 95 are mounted in the lower end of end members 85 and 86 in rigid relation for rotatably mounting endless member guide sprockets 96 at opposite ends thereof and a loop retaining tubular guide roller 97 therebetween. Endless members 65 are engaged about guide sprockets 96 so that the lower ends of the loops extending into the treatment tanks are engaged and guided by sprockets 96 so that the endless members are held in position and guided in their lineal movement through the treatment tanks. Guide rollers 97 engage the lower ends of the loops formed in sheet material being treated in the tanks for holding and guiding these loops in the movement of the sheet material, strips and the like through the tanks for treatment. Guide rollers 97 have a larger interior diameter than the exterior diameter of shafts 95 in order that the rollers are freely rotatable and movable into eccentric relation to shafts 95 in order to take up slack in the loops of sheet material being treated and compensate for expansion and contraction of the sheet material in the loops.

Each of the guide units is constructed to support the several guide rods and shafts for all of the loops within a tank, one unit being provided for each tank or each compartment in a tank. For example, as shown in Fig. 2, developing tank 6 is constructed to have three loops extend into the bottom of the tank so that the sheet material being treated is looped three times or passes through three downwardly and upwardly extending paths through the developing tank. Then the material is passed upwardly and downwardly through two looped paths in wash tank 7 and six loops in fixing tank 8. In wash tank 9, as clearly shown in Fig. 7, a separate guide unit is provided in each compartment constructed for receiving two loops, so that five guide units are used in wash tank 9, one in each compartment. Each of the end members 85 is formed with a plurality of apertures 98 arranged in aligned relation with apertures 32 in nozzles 31 in order that the liquid discharged under pressure from the apertures in the nozzles can be projected through apertures 98 for obtaining the circulation of the liquid in the treatment tanks.

In order to exclude light from developing tank 6, wash tank 7 and fixing tank 8, a baffle plate 100 is mounted in transversely extending relation between supporting bars 4 at the front end of wash tank 9 as shown in Fig. 7, so that it extends from the upper edges of supporting bars 4 into the upper portion of the first compartment in wash tank 9 in aligned relation with the first row of spacer rods 88 in the guide unit in the first compartment of tank 9. Baffle plate 100 is slotted to receive end plates 85 and 86 in the first compartment of tank 9 and the side edges are detachably held between the inner faces of bars 4 in light-tight relation. A cover plate 101 has a forward end as shown in Fig. 6 slidably engaged under the lower edges of rear wall section 61 of feed casing 46 and the side edges seated on the upper faces of the upper flanges of channel supporting bars 4 with depending flanges on the free side edges extending downwardly beyond the outer edges of bars 4, as indicated in dotted lines in Figs. 2 and 7. The rear edge of cover 101 has a depending flange engaging with the upper forward edge of baffle plate 100, in the manner shown in Fig. 8. Cover 101 and baffle plate 100 cooperate to exclude light from the developing and fixing tanks and also provide a light trap and exit passage at the rear end of cover 101 about baffle plate 100 for unobstructed movement of endless members 65 with sheet material fed with the movement of these endless members through the treatment baths.

Endless chains are illustrated as forming the endless members 65. They are engaged over the several sprockets for feeding and guiding sheet material in lineal movement from the feed casing to the bottom portion of the feed casing, as shown in Fig. 6, to the sprockets and guide roller on the first of the series of shafts 70 from which the chain then extends through the several treatment baths in the loop formation above described. Each of the endless chains is of conventional construction and has a plurality of selected links in each chain arranged in opposite corresponding relation formed to provide angle members 102 having inwardly extending portions supporting attachment pins 103 with which a strip feed bar 104 is detachably engageable.

Each of the strip feed bars, shown in detail in Figs. 10 and 11 is formed of a channel member 105 having a terminal member 106 rigidly secured one at each end of bar 105 in the channel portion thereof. The inner end of each terminal member 106 has an inwardly extending flange 107 formed with a bifurcated outwardly extending projection 108. This bifurcated projection is formed so that the slot in the end is slightly smaller than the diameter of attachment pins 103 with an enlarged opening spaced inwardly from the end of the projection in communication with the slot to enable the projection to be snapped on to one of the attachment pins 103 in a convenient manner. This provides a feed bar construction that may be detachably secured to attachment pins 103 in transversely extending relation between endless chain members 65. A retainer strip 109 of flexible spring steel or the like having a length greater than the distance between the inner ends of flanges 107 but substantially less than the distance between the ends of terminal members 106 as shown in Fig. 11 is adapted to have one end inserted under one flange 107 at one end of channel member 105 in a position so that the opposite end will clear the inner end of the opposite flange 107. By slidable movement endwise the end of retainer strip 109 can be engaged under the other flange 107 so that the strip can be moved into the position shown in Fig. 11 and resiliently and frictionally retained in position in attached relation in channel member 105 of feed bar 104.

Retainer strip 109 is used to retain the end of sensitized strip material in firmly engaged relation in channel member 105 so that strip feed bar 104 when attached to endless members 65 at opposite ends will serve to move with the endless members for feeding a sensitized strip through the treatment baths from the feed casing and through the drier and subsequent winding on the receiving drum in an efficient manner. These feed bars are detachably mounted between endless members 65 so that the retainer strip 109 may be removed from channel member 105. When strip 109 is removed from channel member 105 the end of a strip wound upon a spool 55 mounted in the cradle in feed housing 46 can be engaged about channel bar 105 and retainer strip 109 then engaged in position to clamp the end of the strip in the feed bar. The bar may then be attached to the nearest pair of attachment pins 103 on endless members 65 in the front of feed casing 46 as indicated in Fig. 6 so that in the subsequent movement of members 65 through the machine the strip within feed casing 46 will be unwound from spool 55 and fed through the machine for treatment. The strip will be fed over guide rollers 110 mounted on the lower shaft 62 in feed casing 46 as shown in Fig. 6 and then over rollers 110 on each of the shafts 70, as shown in Figs. 6 and 7. Guide rollers 110 extend between the sprockets on each end portion of each of the shafts. They are rigidly mounted on each of the shafts for positive rotation in the operation of the machine by the driving motion imparted to shafts 70.

The sensitized strip material placed in the feed casing may be a photo-sensitized strip on which photographic images have been produced in a suitable camera and which it is desired to develop to obtain prints. This machine provides for fully developing and drying of sensitized strip material. Feed bars 104 are so constructed that they freely pass over guide rollers 110 and throughout the several tanks in movement with the endless members 65. They lead the end of a sensitized strip downwardly from the roller 110 shown on shaft 70 at the front end of the machine in Fig. 6 into the first loop in the developing tank 6 to the bottom portion of the tank where the strip is then looped under and above tubular guide roller 97, in the manner shown in Figs. 2 and 7, and then upwardly to the guide roller 110 on the next adjacent shaft 70. The strip is then led through the remaining loop portions in up and down relation in the developing tank from which it is led to wash tank 7 and through the two loop portions provided in the path formed therein. From wash tank 7 the strip is then led through the six downwardly extending loop portions provided in fixing tank 8 and finally through the several loop portions provided in the several sections of wash tank 9 for completely developing, fixing and washing the sensitized coating on the strip. The guide units in the several tanks with spacer rods 88 efficiently guide the sheet material in the loop paths of travel through the several tanks with members 65.

The strip is then led from the rear end of wash tank 9 outwardly and upwardly at the rear end of the frame to the drier. As endless members 65 and the strip fed thereby leave the rear end of wash tank 9 the strip is engaged with a squeegee device indicated at 114 in Fig. 7. This squeegee device includes a pair of flexible rubber squeegee strips mounted in transversely extending holder bars 116. A connecting bar 118 secures the free ends of arms 117 together in rigid relation while the opposite ends of arms 117 are pivotally mounted on a supporting rod 119 extending transversely and secured at opposite ends in horizontal supporting bars 4. Connecting bar 118 carries one of the holder bars 116 while the other one is mounted on a transversely extending rod 122 mounted at opposite ends on frame bars 4. Arms 117 have extensions 120 formed adjacent the free ends thereof to which one end of a tension spring 121 is secured while the opposite end is anchored to a pin carried by supporting bars 4. Tension springs 121 normally rotate arms 117 in a counter-clockwise direction, as shown in Fig. 7, about supporting rod 119 to move the squeegee carried thereby into engagement with the strip being treated and led from wash tank 9 and for engaging the strip with the squeegee on rod 122. Idler sprockets for chains 65 are mounted on bar 118 at opposite ends of the squeegee thereon for guiding the chains as well as the strip. Arms 117 provide for movement of the squeegee strips apart so that a feed bar 104 may pass between them in leading a strip toward the drier. The squeegee strips scrape the excess water from opposite surfaces of the strip for eliminating as much water as possible from the strip as it enters the drier.

The drier disclosed herein includes a plurality of driven and idler drying drum units 125 and 126, respectively. Each of the driven and idler drying drum units has a pair of mounting brackets 127 mounted in alternate upwardly and downwardly extending relation on upper side bars 2 of the frame for supporting transversely extending tubular shafts 128. As illustrated in Fig. 2, four of the drying drums are mounted on shafts positioned above top side bars 2 and four drying drums are positioned below top side bars 2 in staggered relation to those on the top of the side bars so that the strip to be dried may be alternately passed over a top drying drum and then a lower drying drum.

Suitable electric cable connections may be extended through tubular shaft 128 for connection with heating units in each drying drum unit for connecting the heating element in circuit with a suitable source of electric supply which may be controlled in any suitable manner for securing the desired degree of heat for each drying drum unit.

Two driven drying drum units 125 are provided in the series of drying drum units, one at the rear end of the machine for receiving the strip after it leaves wash tank 9 and the other at the opposite end of the series of drying drum units in the manner shown in Fig. 2.

Each driven drying drum unit has a sprocket disc 134 rotatably mounted on shaft 128 at opposite ends of each drum. Endless members 65 are engaged over sprockets 134 and are adapted to drive drying drum units 125 to feed the strip through the drier.

Sprocket wheels 134 are also mounted at opposite ends of the idler drying drums on shafts 128 for supporting endless member 65 in their travel to convey the strip over the several drums in the desired manner for drying.

The strip after leaving the squeegee passes upwardly at the rear end of the frame to the rearmost driven drying drum unit 125, as shown in Fig. 2, and then passes over the series of idler drying drum units in alternate relation below and above top side bars 2 and finally to the last driven drying drum unit 125 at the forward end of the series of drying drums, as shown in Fig. 2. Endless chain members 65 are engaged over the sprocket discs or wheels of the several drying drum units for feeding the strip over these units as indicated in Fig. 2.

Endless members 65, upon leaving the last driven drying drum unit 125, are extended to and engaged over sprockets on shaft 150 rotatably mounted in bearings at opposite ends carried by top side frame members 2. Endless members 65 then extend to sprocket 63 at the upper rear portion of feed casing 46 and at the entrance to the feed casing through the light-trap. The endless members then extend through the light-trap into the casing over the several pairs of sprockets 63 in the manner shown in Fig. 6 and in subsequent lineal movement continue the endless path of travel through the feed casing, the treatment bath, the drier and back to the feed casing as described.

The sheet material being treated is extended from the last driven drying drum unit 125 of the series to a receiving drum 151 mounted on a shaft 152, see Fig. 1, rotatably mounted at the front portion of the frame on top side bars 2.

A drive spindle 155 carries one end of shaft 152 as shown in Figs. 3 and 4 rotatably mounted in a suitable bearing in the supporting frame and has a reduced outer end 159. The reduced outer end 159 rotatably mounts a drive sprocket 160, Fig. 1, having a friction drive connection therewith resiliently maintained through the medium of spring 161 and collar 162 adjustably mounted on reduced extension 159. Endless drive chain 163 is engaged over a sprocket mounted on the outer end of shaft 150 and sprocket 160 so that driving power from endless member 65 is transmitted through shaft 150 to rotate receiving drum 151 and wind the completely treated sheet material thereon.

As the lead end of a treated strip of sheet material reaches the last driven drying drum unit 125, the feed bar 104 feeding the strip through the machine engages under a roller 165 carried by pivoted arms 166 mounted on rotatable rod 167 extending between and rotatably mounted in top side bars 2 Fig. 2. Feed bar 104 in passing under roller 165 moves the roller outwardly from the surface of drum 131 and rotates shaft 167 in pivotal movement of arms 166. This pivotal movement rotates the pivoted signal operating arm 168, the movement of which is used to close an electric contact or operate mechanical means of a character well known in the art for operating an audible signal so that the operator will know when the lead end of the strip leaves the last drying drum of the drying unit. Audible signal 169 may be of any conventional form known in the art that is adapted to be set in motion or operated by the movement of a pivoted arm, such as arm 168. The operator then removes the feed bar from endless member 65 and when the end of the strip is long enough to engage it over receiving drum 151 the free end is engaged in a transverse slot in drum 151 for winding upon the drum.

When strip material is completely wound on drum 151, it may be removed from the frame by disengaging shaft 152 from its mounting in the frame and drive spindle 155. The drum may then be moved to another machine for unwinding the strip therefrom.

The operator removes feed bar 104 from the end of the strip prior to engaging the end of the strip in receiving drum 151 for winding thereon. Should the operator fail to remove feed bar 104 from the strip at the proper time, the strip will be carried with the feed bar back into feed casing 46 and through the machine again for complete reprocessing without damage to the strip. Feed bar 104 can be allowed to remain engaged with endless members 65 if desired after the removal of the end of the strip. If it is allowed to remain engaged with endless members 65 feed bar 104 will pass into the entrance at the rear of feed casing 46 through the light trap and continue with the endless members to move through the machine in the usual manner.

A modified form of feed bar is illustrated in Figs. 12 and 13. It includes a feed bar 170 provided with a longitudinal slot in the central portion indicated at 171 in Fig. 12. Terminal members 172 are rigidly mounted on opposite ends of bar 170 and provided with bifurcated projections on the outer end similar to projections 108 for detachable engagement with attachment pins 103 on endless members 65 in the same manner that the feed bar shown in Figs. 10 and 11 is engaged with pins 103 on endless members 65. The end of a piece of strip material to be treated is threaded through slot 171 and about bar 170 in a convenient manner to interlock the end of the strip with bar 170 so that it will be fed through the machine in the manner above described for processing the photo-sensitive surfaces on the strip.

One or more strips of varying widths can be fed through the apparatus as above described simultaneously so as to utilize the full extent of the width of the machine. Either a wide sensitized strip or two or more smaller strips can be fed through the machine simultaneously. By providing sufficiently large supply tanks for the developing and fixing solutions and by the continuous circulation of these solutions in the respective treatment tanks, one batch of fluid can be mixed to operate the machine efficiently for a full working day. This overcomes the disadvantage of previous apparatus which requires frequent changes of developing chemicals. In addition, the positive circulation of the developing chemicals also insures more efficient use of the chemical strength of the solutions in developing operations effecting substantial saving in the cost of chemicals and with the elimination of frequent changes of chemical solutions effects considerable saving in the cost of producing photographic prints in the present apparatus over previous devices heretofore used.

The invention claimed is:

1. Photographic developing apparatus, comprising a supporting frame, a pair of spaced parallel horizontal supporting bars mounted in said frame in spaced relation above the bottom thereof, a treatment tank positioned below said supporting bars in aligned relation with and opening upwardly between said bars, means detachably suspending said tank from said bars, a plurality of independent conveyor units removably engaged between said bars in transversely extending adjacent relation each having a depending portion extending below said bars into said tank, means extending between said bars through the upper ends of said units independently and detachably mounting said conveyor units between said bars for removal from between said bars upwardly for complete detachment from said frame and tank without disturbing the mounting for said tank, and said tank and conveyor units being formed for cooperation to provide for the lowering of said tank to the bottom of said frame for removal from said frame without removing said guide units.

2. Photographic developing apparatus, comprising a supporting frame, a pair of spaced parallel horizontal supporting bars mounted in said frame in spaced relation above the bottom thereof, a plurality of treatment tanks positioned below said supporting bars in aligned relation with and opening upwardly between said bars, means independently and detachably mounting all of said tanks in suspended relation on said bars, a plurality of independent conveyor units each removably engaged between said bars and having depending portions extending below said bars into one of said tanks, a pair of bars for each unit detachably engaged with a unit and detachably engaging said supporting bars for suspending said units from said supporting bars, said pair of bars mounting said units for detachment and removal upwardly from between said bars and said tanks, and a conveyor movably mounted on said conveyor units for feeding sheets through said tanks for successive treatment, said tanks, frame and conveyor units being cooperatively formed to provide for the lowering of one of said tanks in said frame for removal therefrom below the depending portions of said conveyor units while said units remain in mounted position in said frame.

3. Photographic developing apparatus comprising a supporting frame having a pair of spaced parallel horizontal supporting bars spaced above the bottom of said frame, a treatment tank suspended from said bars and opening upwardly therebetween, a drain pipe coupling formed on the bottom portion of said tank, a drain pipe connected to said coupling and extending outwardly at one side of said tank, an inverted U-shaped overflow pipe having one end connected to said drain pipe and extending upwardly beside said tank with the curved portion joining the legs of said overflow pipe positioned at a predetermined level near the top portion of said tank for determining the liquid level in said tank and providing an overflow for the discharge of liquid introduced into said tank for maintaining said level, said pipes being removable with said tank from said frame.

4. Photographic developing apparatus comprising a supporting frame having a pair of spaced parallel horizontal supporting bars spaced above the bottom of said frame, a treatment tank suspended from said bars opening upwardly therebetween, an inverted U-shaped overflow conduit having the lower end of one leg thereof connected for communication with the interior of said tank and the portion connecting the legs of said U-shaped overflow positioned at the top portion of said tank for determining the liquid level in said tank and providing for the overflow of excess liquid to maintain said level, said conduit being removable with said tank from said frame.

5. Photographic developing apparatus comprising a supporting frame having a pair of spaced parallel horizontal supporting bars spaced above the bottom of said frame, a treatment tank suspended from said bars opening upwardly therebetween, an inverted U-shaped overflow conduit having a pair of spaced parallel legs, the lower end of one leg connected for communication with the interior of said tank at the bottom, said conduit extending upwardly beside said tank with the section joining the upper ends of the legs located near the top of said tank to determine the liquid level therein and provide an overflow for excess liquid through said inverted U-shaped conduit, and means forming part of the connection at the bottom of said tank operable to open said overflow conduit at the bottom of said tank for draining the liquid from the tank, said overflow conduit and means being removable with said tank from said frame.

6. Photographic developing apparatus comprising a supporting frame having a pair of spaced parallel horizontal supporting bars spaced above the bottom of said frame, a treatment tank suspended from said bars opening upwardly therebetween, means mounted on said bars for conveying a sheet in transversely extending relation downwardly and upwardly in said tank through a substantially U-shaped path, said means having end supporting plates depending in said tank with at least one end plate formed with a series of apertures in the central portion, and means for circulating the treating fluid in said tank having a nozzle extending in upright relation in one side of said tank adjacent said apertured end plate and formed with a plurality of discharge openings on the inner side in registry with the apertures in said end plate for circulating fluid in transverse horizontal relation through the apertures in said end plate between the upwardly and downwardly extending portions of said path for sheet material.

7. Photographic developing apparatus comprising a supporting frame having a pair of horizontal supporting bars spaced above the bottom of said frame, a treatment tank suspended from said bars, and means for conveying sheet material through said tank for treatment therein having a conveyor unit formed with a pair of spaced end members, one end member having a plurality of sockets on the inner face thereof, the other end member having a plate section formed with apertures in corresponding positions to said sockets, a retainer plate section mounted in superimposed relation on the outer face of said first-mentioned plate section, a plurality of spacer and guide rods having opposite ends engaged in aligned sockets and apertures in said end members, means detachably securing said end members together in spaced parallel relation to form a rigid conveyor unit, roller guide means mounted between the lower ends of said end members, said end members having the distance therebetween less than the distance between said supporting bars, and means detachably mounting said unit on said bars in suspended relation in said tank for removal of said unit upwardly between said bars.

8. Photographic developing apparatus comprising a supporting frame having a pair of horizontal supporting bars spaced above the bottom of said frame, a treatment tank suspended from said bars, and means for conveying sheet material through said tank for treatment therein having a conveyor unit formed with a pair of spaced end members, said end members being formed with aligned sockets in adjacent faces, a plurality of spacing and guide rods extending perpendicularly between said end members, means securing said end members together in assembled relation for retaining said rods in said sockets, said unit being engaged in suspended relation in said tank by movement downwardly between said horizontal bars, and a pair of supporting rods extending horizontally in spaced relation through the upper ends of said end members and having the ends detachably engaged in said supporting bars for detachably suspending said unit therefrom in said tank.

9. Photographic developing apparatus comprising a frame, a pair of spaced parallel supporting bars mounted in the central portion of said frame in horizontal relation, a plurality of treating tanks extending between and suspended from the lower edges of said bars in light-tight cooperation, a feed casing mounted on the front upper edges of and extending above said bars in light-tight cooperation with said bars, frame and tanks at the front of said frame, said casing having side walls extending upwardly in spaced parallel relation along said bars, a plurality of rear wall sections connecting the rear portions of said side walls in spaced parallel staggered relation to form openings alternately at the top and bottom forming a light trap and a circuitous passage into said casing, spool supporting means mounted in said feed casing to provide access for inserting and removing spools from said spool supporting means, a cover plate engaged on top of said supporting bars and extending between said bars casing above said supporting bars, a door in said rearwardly from said feed casing in light-tight relation therewith, a light trap formed at the rear end of said cover plate in cooperation with an adjacent treatment tank to form a circuitous passage, conveyor supporting means mounted on said supporting bars having portions extending into said tanks for guiding a print conveyor into and out of each of said tanks, means mounted on upper portions of said frame above said cover plate for guiding said conveyor means, means mounted in said feed casing for guiding said conveyor means therein past said spool supporting means and door, means mounted in said light traps for guiding said conveyor through said light traps, endless conveyor members arranged in spaced parallel relation on said conveyor supporting means, said conveyor members extending through said feed casing into said treating tanks, outwardly through the light trap at the rear end of said cover plate to the upper portions of said frame above said cover plate and through the circuitous passage between said rear wall sections into said feed casing, and means for detachably connecting the end of a strip of material to said endless conveyor member in said feed casing for feeding through said tanks in the light-tight portion of said apparatus and then outwardly to the upper portion of said frame above said bars and cover plate.

10. Photographic developing apparatus comprising a pair of spaced parallel supporting bars, a plurality of treatment tanks suspended from the under side of said bars in light-tight cooperation, a feed casing mounted on the upper edges of said bars at one end in upwardly extending light-tight relation, a cover plate extending rearwardly from said feed casing in light-tight relation on the upper edges of said bars, a light trap at the rear end of said cover plate forming a circuitous passage in cooperation with said bars and tanks, a light trap forming a rear wall and circuitous passage in said feed casing above said cover plate, spool supporting means in said feed casing, a door in said feed casing providing access to said spool supporting means and conveyor means, and endless conveyor means, means to guide said conveyor means through said feed casing above said bars into and through said tanks and between said bars below said cover plate, outwardly through the light trap at the rear end of said cover plate, above said cover plate and back into said feed casing through the light trap in the rear wall of said feed casing and between the door and spool supporting means, and means for attaching the end of a strip to said endless conveyor means for movement thereby from said feed casing through said treatment tanks in the light-tight portion of said apparatus, outwardly through the light trap at the rear of said cover plate and then upwardly above said cover plate and supporting bars at the outside of the light-tight portions of said apparatus.

AMBROSIUS BRIECHLE.

REFERENCES CITED

The following references are of record in the file of this patent:

UNITED STATES PATENTS

| Number | Name | Date |
|---|---|---|
| 1,463,489 | Shannon | July 31, 1923 |
| 1,479,661 | Gates | Jan. 1, 1924 |
| 1,760,048 | Dufay | May 27, 1930 |
| 1,772,834 | Hopkins | Aug. 12, 1930 |
| 1,822,345 | Greene | Sept. 8, 1931 |
| 1,865,682 | Dye | July 5, 1932 |
| 1,894,092 | Greene et al. | Jan. 10, 1933 |
| 1,900,825 | Liberman | Mar. 7, 1933 |
| 1,902,281 | Helms | Mar. 21, 1933 |
| 1,919,926 | Bodan | July 25, 1933 |
| 1,940,202 | Bodan et al. | Dec. 19, 1933 |
| 1,958,791 | Kalbfleisch | May 15, 1934 |
| 1,965,504 | Macon | July 3, 1934 |
| 1,967,889 | Kitroser | July 24, 1934 |
| 2,060,286 | Doetzel, Jr. | Nov. 10, 1936 |
| 2,102,843 | Gwynne | Dec. 21, 1937 |
| 2,105,165 | Schnelz | July 11, 1938 |
| 2,169,758 | Capstaff | Aug. 15, 1939 |
| 2,179,026 | Sullivan | Nov. 7, 1939 |
| 2,236,712 | Landrock et al. | Apr. 1, 1941 |
| 2,244,170 | Miketta et al. | June 3, 1941 |
| 2,263,380 | Coleman | Nov. 18, 1941 |
| 2,265,975 | Lloyd | Dec. 9, 1941 |
| 2,325,255 | Lenz | July 27, 1943 |
| 2,332,296 | Brunk | Oct. 19, 1943 |
| 2,344,941 | Dutch | Mar. 28, 1944 |
| 2,355,109 | Riddick | Aug. 8, 1944 |
| 2,385,681 | Brick | Sept. 25, 1945 |

FOREIGN PATENTS

| Number | Country | Date |
|---|---|---|
| 357,597 | Great Britain | Jan. 27, 1931 |
| 834,867 | France | Sept. 5, 1938 |